Nov. 25, 1952     C. C. HIBBS     2,618,801

ROOT AND GUM STIMULATOR

Filed Dec. 1, 1947

Charlie C. Hibbs
INVENTOR.

BY

Patented Nov. 25, 1952

2,618,801

UNITED STATES PATENT OFFICE 2,618,801

ROOT AND GUM STIMULATOR

Charlie C. Hibbs, Bismarck, N. Dak.

Application December 1, 1947, Serial No. 789,019

1 Claim. (Cl. 15—167)

This invention relates to new and useful improvements in brushes and the primary object of the present invention is to provide a device for stimulating the roots and gums of the human mouth so as to prevent and eliminate the occurrence of cemento-periostitis or as more commonly referred to as pyorrhea.

Another important object of the present invention is to provide a root and gum brush so designed as to stimulate, toughen, harden and make the gum tissue, namely, the gingival attachment to the root area, and in between the roots, clean and healthy.

A further object of the present invention is to provide a root and gum brush including a novel and improved bristle arrangement so designed as to permit a simultaneous brushing of the gum tissue as well as the teeth.

A still further aim of the present invention is to provide a root and gum brush that is simple and practical in construction, strong and reliable in use, small and compact in structure, neat and attractive in appearance, relatively inexpensive to manufacture; and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
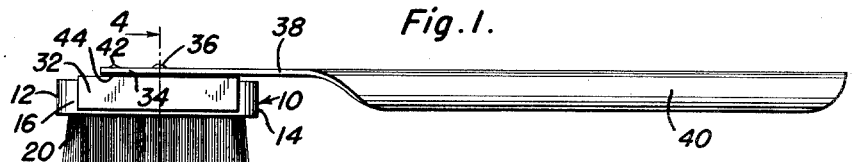
Figure 1 is a side elevational view of the present root and gum brush.
Figure 2:
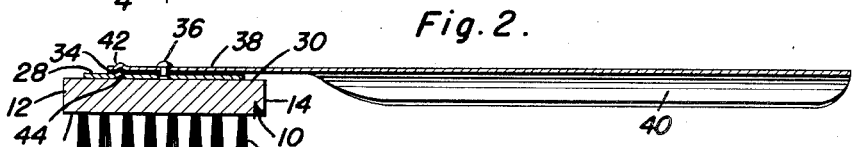
Figure 2 is a longitudinal vertical sectional view taken substantially through the center of Figure 1.
Figure 3:
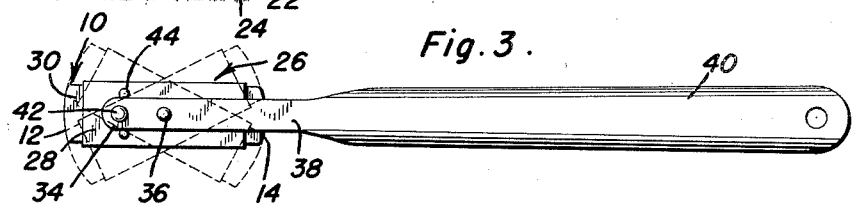
Figure 3 is a top plan view of Figure 1, and with dotted lines showing selected pivotal positions of the brush head.
Figure 5:
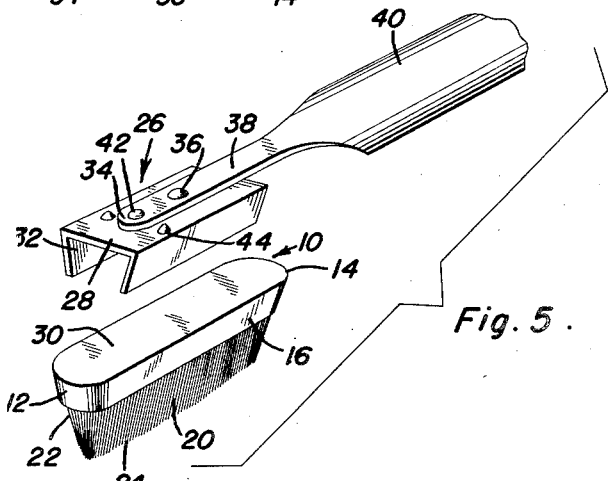
Figure 5 is a fragmentary group perspective view of the present root and gum brush.
Figure 4:
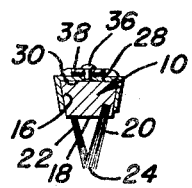
Figure 4 is a transverse vertical sectional view taken substantially on the plane of section line 4—4 of Figure 1.

Referring now to the drawings in detail, wherein for the purpose of illustration, there is disclosed a preferred embodiment of the present invention, the numeral 10 represents a brush head generally having rounded end portions 12 and 14 and downwardly and inwardly inclined side edges 16.

Fixedly recessed in the lower face 18 of the brush head, is a row of groups of longitudinally spaced bristles 20 that incline inwardly and downwardly. Also fixedly recessed in the lower face 18 of the brush head is a further row of groups of longitudinally spaced bristles 22 that are staggered relative to the first row of bristle 20. These latest bristles 22 incline downwardly and inwardly so that the lower ends 24 of all of said bristles are coplanar.

Slidably and frictionally engaging the brush head 10 is a substantially channel shaped retaining member designated generally by the numeral 26 whose web portion 28 frictionally bears upon the upper face 30 of the brush head 10, and whose inclined side faces or legs 32 frictionally bear against the inclined side edges 16 of the brush head.

Pivotally secured adjacent its inner end 34 by a rivet or the like 36 is the substantially flat end portion 38 of a concavo-convexed handle 40. This end portion 38 is provided with a conical recess 42 in its lower face that is adapted to frictionally engage one of a selected group of protuberances 44 projecting upwardly from upper face 30 of the brush head, for retaining the handle disposed at a selected angle relative to the brush head.

Figure 6:
Figure 6 is a bottom plan view of the present brush in slightly modified form; and, Figure 7 is a fragmentary side elevational view of Figure 6.
Figure 7:
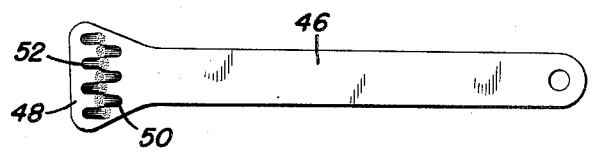

Reference is now directed to Figures 6 and 7, wherein there is disclosed the present invention in slightly modified form. In this embodiment, the numeral 46 represents an elongated handle terminating in an enlarged brush head 48 at one end. A row of spaced groups of bristles 50 are secured to the lower face of said head 48 and incline downwardly and forwardly in staggered relationship to a further row of spaced groups of bristles 52 that incline downwardly and rearwardly. The lower ends 54 of the bristles 50 and 52 terminate in a plane spaced parallel to the longitudinal axis of the handle 46.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A root and gum stimulator comprising a handle terminating in a flat brush head, a first row of spaced groups of bristles carried by the head, and a second row of spaced groups of bristles carried by the head, the groups of bristles of said first row being staggered relative to the groups of bristles of said second row, the groups of bristles of said first row and the groups of bristles of said second row inclining inwardly and downwardly toward each other, the bristles of each row terminating in a common plane parallel to the head, the outer ends of the groups of bristles of said first row being in alignment with the outer ends of the groups of bristles of said second row to form a single row of bristles at the outer ends of said groups of bristles, said first row and said second row extending transversely of said handle.

CHARLIE C. HIBBS.

REFERENCES CITED

The following references are of record in the file of this patent:

UNITED STATES PATENTS

| Number | Name | Date |
|---|---|---|
| 424,716 | Lichtenstein | Apr. 1, 1890 |
| 1,091,209 | Gates | Mar. 24, 1914 |
| 1,285,815 | Simmons | Nov. 26, 1918 |
| 1,346,536 | Fitz-Gibbon | July 13, 1920 |
| 1,369,966 | Cosens et al. | Mar. 1, 1921 |
| 1,468,888 | Stuart | Sept. 25, 1923 |
| 1,753,290 | Graves | Apr. 8, 1930 |
| 1,835,320 | Myers | Dec. 8, 1931 |
| 2,004,633 | Miller | June 11, 1935 |
| 2,064,860 | Sekine | Dec. 22, 1936 |
| 2,168,964 | Strasser | Aug. 8, 1939 |
| 2,242,743 | Brown | May 20, 1941 |

FOREIGN PATENTS

| Number | Country | Date |
|---|---|---|
| 349,921 | Italy | July 1, 1937 |
| 444,382 | Great Britain | Mar. 19, 1936 |